3,758,457
PROCESS FOR RECOVERING REGENERATED CELLULOSE

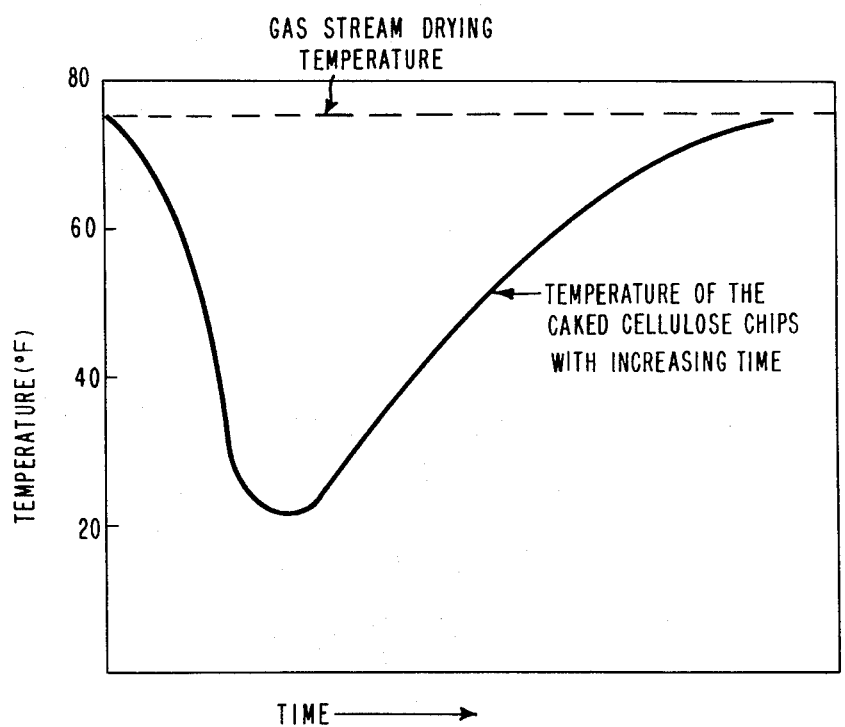

James Samuel Ten Broeck, Jr., Robert Bruce Perry, and Dale Roderic Laurance, Lawrence, Kans., and John Richard Fisher, Clinton, Iowa, assignors to E. I. du Pont de Nemours and Company, Wilmington, Del.
Filed Jan. 25, 1972, Ser. No. 220,649
Int. Cl. B29h 19/00
U.S. Cl. 260—212       14 Claims

ABSTRACT OF THE DISCLOSURE

An improved process for recovering regenerated cellulose from softened and coated regenerated cellulose. The process comprises: (a) comminuting the softened and coated regnerated cellulose to chips, (b) humidifying the chips by adding water to the chips wherein the water swells the chips, (c) extracting both water and softener from the chips by flushing with a softener extraction agent, (d) removing the coating from the chips by flushing the chips with a coating solvent, (e) slurrying the chips in water and coating solvent, (f) selectively drying the slurry to remove the coating solvent leaving recovered regenerated cellulose chips. These recovered chips can be used in various ways such as an ingredient used in the preparation of carboxymethylcellulose or recycled back through a process of making regenerated cellulose. The softener, softener extraction agent, coating and coating solvent are also recovered and reused.

BACKGROUND OF THE INVENTION

This invention relates to recovery and reuse of the main constituents of coated or waste surplus regenerated cellulose materials.

Surplus regnerated cellulosic materials are usually formed in the finishing operations of the regenerated cellulose film manufacturing process and comprise edge trimmings from the flat-sheet packing operation and from the slit-roll forming operation as well as in the form of material which was judged to be off-standard in quality at any stage of the operation after the formed film is initially dried. The essential components of the surplus regenerated cellulose film which both comprise the major constituents and are recoverable by chemical processing are the basic regenerated cellulose, the cellulose softener (sometimes called a plasticizer) and the coating materials.

The regenerated cellulose is generally produced by the viscose process in which cellulose pulp is converted to a cellulose xanthate solution. This process comprises steeping of the cellulose pulp in caustic soda to produce alkali cellulose, removal of the excess caustic soda from the alkali cellulose, comminuting the alkali cellulose, aging the comminuted alkali cellulose, treating the aged alkali cellulose with carbon disulfide to form cellulose xanthate and dissolving the xanthate in dilute caustic soda solution to form the viscose. This solution is filtered, evacuated and aged for a number of hours and then extruded through a long, narrow casting die into a sulfuric acid-sodium sulfate bath which first coagulates the cellulose xanthate solution into a coherent web of film and then decomposes the xanthate to produce a moisture-laden, gel-film structure which is then passed through a series of treating baths to wash, desulfurize, bleach and soften the web. The web is softened by passing it through liquid softener solutions comprising water, plus another ingredient such as glycerine and/or propylene glycol.

The purified and plasticized web is dried to a moisture content of about 4 to 8% by passing it over a series of heated rolls. This dried and softened regenerated cellulose film is then normally coated with a transparent, organic, polymeric material in order to improve such specific performance characteristics of the web as moisture-proofness, heat-sealability, dimensional stability and gas permeability. Coating materials containing nitro-cellulose and/or vinylidene chloride copolymers are commonly employed to broaden the end-use applications of the regenerated cellulose film in the packaging industry. These materials are first put into solution by use of volatile organic solvents such as acetone, methyl ethyl ketone, ethyl acetate, tetrahydrofuran and toluene. The solutions of the organic polymeric coatings are usually applied to the regenerated cellulose film by passing the continuous film through the coating solution, metering a given amount of the solution onto the film's surface, smoothing the solution uniformly across the web and drying the web to remove the solvent and solidify the coating material.

During the process of preparing such cellulose webs, scrap cellulose results in an amount sufficient to make it economical to provide a scrap-recovery system to recover primarily the impregnated plasticizer, the coating and the cellulose itself. Therefore, it is desirable to provide an efficient and economic process of recovering the plasticizer, coating and cellulose from waste cellulose.

SUMMARY OF THE INVENTION

Accordingly, the present invention provides an improved process for recovering regenerated cellulose from softened and coated regenerated cellulose which comprises:

(a) comminuting the softened and coated regenerated cellulose;

(b) humidifying the comminuted cellulose by adding water to the comminuted cellulose wherein the water swells the comminuted cellulose;

(c) extracting the water and softener from the humidified comminuted cellulose by flushing with an extraction agent;

(d) drying the coated comminuted cellulose to remove the softener extraction agent;

(e) removing the coating from the comminuted cellulose by flushing the comminuted cellulose with a coating solvent;

(f) adding water and coating solvent to the comminuted celluose already laden with coating solvent to form a slurry; and (g) drying the slurry of water, coating solvent and comminuted cellulose with a stream of gas selectively removing the coating solvent leaving dried comminuted cellulose.

The extract of softener and softener extraction agent from step (c) above is recovered by rectifying the extract through fractional distillation. The recovered softener extraction agent is reused in the extraction of water and softener from the comminuted cellulose, and the softening agent in water is reused to soften cellulose film.

The extract of coating solvent and coating material from step (e) above is recovered by filtering the extract to remove insoluble coating additives such as waxes, and the solvent having the coating dissolved therein is used in preparation of the coating solution make-up baths which are reused to coat cellulose film.

The coating solvent recovered from the selective drying step (g) above is returned to the coating solvent make-up tank and is reused in coating cellulose film.

In an alternate embodiment, where it is desirable to use a prior art process for recovering the softener, part of the process of the present invention can be used as follows:

In a process for recovering cellulose from softened and coated comminuted regenerated cellulose wherein the softener is first removed leaving coated comminuted cellulose wherein the internal pores of the cellulose are open, the improvement of removing the coating by the process consisting essentially of:

(a) removing the coating from the comminuted cellulose by flushing the comminuted cellulose with a coating solvent;
(b) adding water and coating solvent to the comminuted cellulose already laden with coating solvent to form a slurry;
(c) drying the slurry of water, coating solvent and comminuted cellulose with a stream of gas selectively removing the coating solvent and the water leaving dried comminuted cellulose.

BRIEF DESCRIPTION OF THE DRAWINGS

FIG. 2 is a typical graph of the temperature of THF caked cellulose chips with increasing time.

DESCRIPTION OF THE INVENTION

Figure 1:
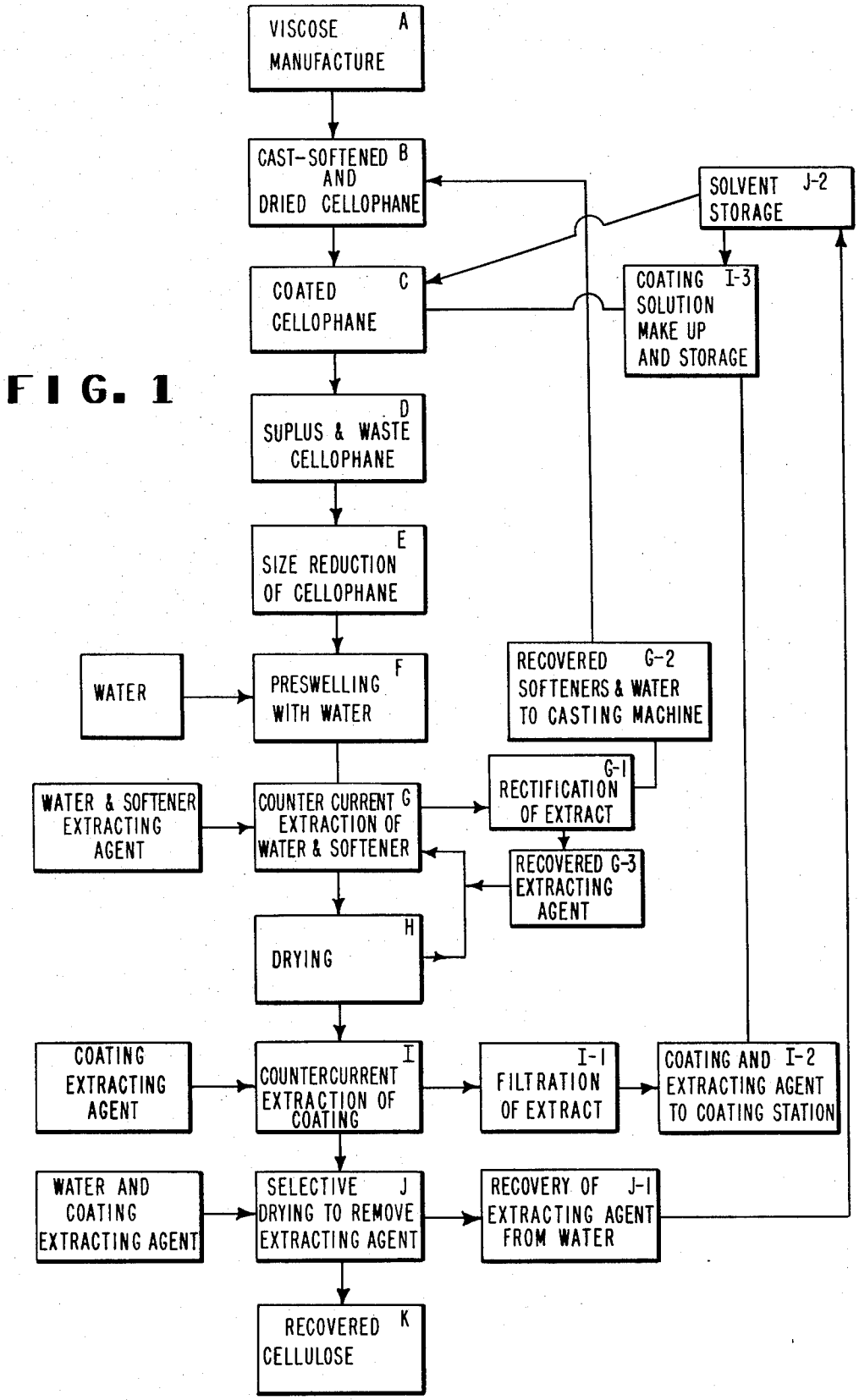
FIG. 1 is a block diagram representing the flow-through process of the preferred embodiment of the present invention.

The preferred process for recovering the softener, coating and cellulose components from coated regenerated cellulose film is shown as a block diagram representation in FIG. 1.

Referring to FIG. 1, Block A represents the known viscose process of manufacturing cellulose wherein cellulose pulp is converted into a cellulose xanthate solution which is dissolved in caustic soda to form the viscose.

The viscose is then cast into a film and passed through a series of baths which wash, desulfurize, bleach, soften and anchor the film. Thereafter, the film is dried. These process steps are represented by Block B. The resulting film has a moisture content of about 4–8 weight percent based on the weight of the cellulose.

The film is then coated. This is represented by Block C. The coating composition is typically a Saran coating used to improve the barrier properties of the film.

After the film is coated, it is slit to various sizes and ready for use. However, during slitting, waste cellophane is generated, namely, the edge trim. Additional waste cellophane is obtained from sources such as cellophane having an off-standard quality, the beginning and end of each roll where the cellophane is damaged and cellophane that is otherwise damaged from the process or handling, such as cellophane adjacent a tear. All waste cellophane is collected and this is represented by Block D.

The surplus coated film used in the reclamation process typically comprises approximately 10 weight percent of coating material, 7 weight percent of water, 17 weight percent of softener materials and 66 weight percent of cellulose.

The gauge of the coated regenerated cellulose sheet material used in the recovery process may vary as the sheet material is fed into the initial recovery apparatus. Generally, the unit weight will vary from about 20 g./m.$^2$ to about 50 g./m.$^2$. There are no known limitations relative to the gauge of the film being reclaimed by the process of this invention.

The coated sheet material is generally coated with a vinylidene chloride copolymer coating or with a nitrocellulose coating. These coatings may have been applied to one or both sides of the sheet material.

The vinylidene chloride copolymers generally used essentially comprise the polymers obtained by polymerizing a mixture of from 80 to 96.5 parts by weight of vinylidene chloride, from 0.1 to 5 parts by weight of itaconic acid and from 3 to 19 parts by weight of at least one monomer selected from the group consisting of acrylonitrile, alkyl esters of acrylic and methacrylic acids having from 1 to 18 carbon atoms in the alkyl group, phenyl methacrylate, cyclohexyl methacrylate, p-cyclohexylphenyl methacrylate, methacrylonitrile, methyl vinyl ketone and vinyl chloride. Such coatings are described by Pitzl in U.S. Pat. 2,570,478. It is preferred that the surplus coated film used in the process of this invention be coated with a vinylidene chloride copolymer coating since the recovery of the constituents of such film is economically more attractive. The process, however, is operable when using uncoated film or film that has been coated with a vinylidene chloride copolymer coating or with a nitrocellulose coating.

While the process of this invention is particularly useful on softened and coated regenerated cellulose, it frequently occurs that softened but uncoated cellulose waste is generated and, therefore, fed into the process in order to remove the softener. Therefore, it should be understood that softened but uncoated cellulose can be simultaneously processed with softened and coated cellulose in the present invention.

The surplus regenerated cellulose film is first reduced in size as represented by Block E so that the softener and coating materials can be successfully extracted. The surplus sheet material is passed through a size reduction device such as a rotary knife and stationary screen cutter where the sheet material is comminuted into chips.

The scrap cellophane is comminuted to facilitate extraction efficiency, especially of the softener. The exact comminuted size is dependent on the extraction efficiency desired and the physical form of the extraction equipment used. For typical efficiencies as described in this patent and using commonly available commercial extraction equipment, also described herein, the final comminuted size as described has been found desirable. Preferably, the comminuted material will pass through a No. 16 U.S. sieve series screen and at least 60% of the comminuted material will pass through a No. 40 U.S. sieve series screen.

The comminuted chips are then humidified with water. The water swells the chips providing increased chip exposure area aiding in the extraction of the plasticizing agent. This is represented in Block F. Without chip swelling, it is more difficult, and with some extraction agents it is impractical, to extract plasticizer to the desired low level with a reasonable number of extractions.

Water is the most practical medium found that will result in the desired change in the cellulose gel structure. As water is added, the gel structure swells until 70% water on a cellulose basis is reached where further addition of water results in very little additional swelling. Water levels above 70% are undesirable since they increase the load on the extraction column and dilute the recovered softener. Water temperature is not critical except as discussed in relation to polymer degradation but is dictated by practical swelling considerations.

The swollen comminuted regenerated cellulose material is then passed to an extractor for removal of the softener ingredients contained within the cellulose chips. This is represented in Block G. It is preferred that countercurrent extraction equipment be employed for this portion of the process. It is understood, however, that other equipment can be used during the extraction step and operational parameters are only specific for specific equipment.

In a countercurrent extractor, the solids are most advantageously carried through a sequence of separate extraction stages in each of which they are immersed, dispersed and collected followed by being lifted and drained in countercurrent flow to that of the extracting agent. In this manner, intimate and thorough contact between the solids and the extraction agent is assured. The maximum temperature throughout softener extraction should not exceed 40° C. wherever vinylidene chloride-coated chips are present if coating degradation is to be minimized.

The degree of softener extraction is determined on a practical basis, i.e., the tolerable level of contamination acceptable in the coating bath. Since virtually all the residual softener can be removed in the following coating recovery system and hence end up in the coating bath, the maximum residual softener level is determined on a coating bath basis. Two percent softener in the coating bath (polymer basis) can cause film blocking. Therefore, using a 10/1 safety factor due to the extremely high risk level, the residual softener in the extracted chips should not exceed 0.2% on a cellulose basis. The exact amount of specified residual softener will be in consequence of obvious practical limitations of the specific process used including intended end use of the recovered polymer solution.

Extraction of softeners from waste film is a function of (1) the gel swelling state of the cellulose, (2) the specific solvent used and its water content, and (3) the effective area through which diffusion can occur.

The following were found useful as softener extracting agents: methanol, acetone, ethanol, isopropanol, n-propanol, and n-butanol. The ability of each of these solvents to penetrate cellulose can be correlated relative to water using an "extraction number" where:

Extraction number (EN)
$$= \frac{[\text{Molecular vol.} \times \text{viscosity}] \ H_2O}{[\text{Molecular vol.} \times \text{viscosity}] \ \text{Solvent}}$$

$EN \leq 1.0$ with a low of 0.07 for n-butanol and a high of 0.70 for methanol and the intermediate solvents follow in order throughout the range.

Using completely swollen cellulose, the above agents can be used to extract the softeners. With cellulose in a semi-collapsed state typically containing about 7% water, the gel structure is such that with solvents having an $EN \leq 0.6$ it is difficult to extract the softener to the desired residual level with a reasonable number of extractions, i.e., less than four crosscurrent washes of coated chips.

The agents extract softeners with increasing efficiency as the amount of water used to humidify and swell the chips is increased from 0 to 70 weight percent on a cellulose basis. By increasing the amount of water in the extraction solvent, the required EN can similarly be slightly decreased. The amount of water acceptable in the softener extraction agent is limited by subsequent drying, rectification and softener concentration requirements, and under practical limitation all of the solvents from ethanol (EN=0.25) on down can require full gel swelling, i.e., 70% water.

It is understood that for some noncritical uses of the final recovered cellulose, a swollen structure may not be necessary and, therefore, elimination of the water-swelling step plus use of a high EN number (high efficiency) softener extraction agent might be acceptable. However, it is the preferred embodiment of this invention that the recovered cellulose from the process of this invention be in the swollen state both for reasons of maximum efficiency of the softener extraction and to provide a recovered cellulose of superior reactivity and performance in such end uses as recycling viscose or in the preparation of carboxymethylcellulose.

The liquid slurry characteristics of the chips are a function of the specific extraction solvent used, the moisture content of the chips, and the liquid-to-cellulose (L/C) weight ratio in the extractor. With water, the chips do not slurry well until an L/C ratio of approximately 19/1 is reached. With solvents such as methanol, ethanol or acetone, the chips slurry typically at L/C=9/1. When the chips are swollen to 70–100% water on a cellulose basis, the chips will still slurry in solvent at a (slurry liquid including water/total chip weight) ratio of 9/1. Changes in solvent moisture content, within the ranges considered for extraction, do not appreciably change the required L/C ratio for adequate slurry characteristics in the extraction agent.

Decreasing the chip particle size increases the rate of softener extraction but does not alter equilbrium conditions. For the same reason, uncoated chips extract at a higher rate than coated chips but for any given swelling level and softener extraction agent the equilibrium soften content is approximately equal to the coated chips.

Many commonly known factors are reflected in the choice of suitable softener extraction fluid in addition to those discussed herein. These will be familiar to those skilled in the art. Examples of such factors are as follows:

(1) For the purpose of this invention and for the common case where most of the coated waste present is saran coated, it is undesirable that the softener extraction fluid attack the coating such as to cause excessive levels of coating ingredients to be present in liquid product from the softener extraction operation and/or to cause sticking of the individual chips together into agglomerates to a degree which will interfere with softener extraction or polymer coating recovery in subsequent operations, for example.

(2) It is a preferred embodiment of this invention that recovered products be of the highest quality attendant with greatest versatility of reuse of these recovered products. Extraction fluids which would attack the waste in such a way as to degrade product color or product solubility in normal reuse applications are therefore undesirable.

(3) Commercial establishments have varying equipment and process demands such as solvent compatibility with existing operations plus health considerations connected with residual solvents in the final product and environmental considerations connected with any losses of solvent which may occur.

It will be recognized that these types of well-known consideration also apply to the coating polymer recovery operation. As a consequence of these commonly known factors plus the specific considerations presented in the preferred embodiments of this invention, various solvents such as those of alkaline nature which would be technically feasible to use and/or those not compatible with an existing primary process, such as DMP and other coating polymer solvents other than THF, have not been included as desirable embodiments.

Based solely on extraction considerations, methanol and acetone appear to be the most suitable. However, the selection of the solvent must also consider process economy in terms of drying and distillation, plus those commonly known types of considerations presented above. Ethanol has been found to be the most suitable in terms of over-all processing, both primary and recovery, and health restrictions, and is therefore stated as the preferred softener extraction agent.

The product stream from the softener extractor typically contains softener, softener extraction agent, water, some fine chips particles and a small fraction of coating composition ingredients, e.g., waxes. This product stream is normally filtered to remove fine chips of cellulose and other precipitates and then distilled to remove the softener extraction agent. This is represented by Block G-1.

The distillation of the product stream (extract column) will yield a product of approximately 20% softener in water. This solution can be analyzed using existing standard laboratory procedures and added directly from stortanks to the casting machine softener bath tanks as represented by Block G-2. These bath tanks now have a level control system which adds approximately one g.p.m. of water to each casting machine as make-up for the water depleted via the dryer softener recovery units. The recovered softener solution can be used as any fraction of this flow with appropriate adjustments in the fresh softener supply to the tank.

The distillation column (extract still) must be capable of rectifying essentially all of the softener extraction agent out of the extraction product.

After the softener is extracted from the chips, the chips are then dried as represented in Block H. Drying of the chips is conveniently carried out by exposing the chips to a dry stream of gas. Drying has been found to be efficient if the chips are not allowed to cake in the dryer to a thickness of more than 1 inch when the gas velocity through the dryer is about 100 feet per minute. Drying is carried out at a temperature no greater than about 30° C. Temperatures above 30° C. can be harmful to the polymer coating which is still on the chips and has yet to be recovered.

It is understood that some discoloration of the final recovered cellulose and/or any residual coating on it may be acceptable for noncritical uses; however, in accordance with the general intent of recovering a cellulose product of wide usage in chemical reactions or for loading plastics, for example, the preferred process as herein presented is such that a non-discolored, high-quality cellulose will be recovered which, because of the preferred swollen structure resulting in addition from this process, as previously mentioned, can be superior to and/or unique from other forms of commercially available cellulose used in making cellulose derivatives and products loaded with cellulose.

The chips are dried until (a) the amount of water retained is about 2.5% or less and (b) the amount of softener extraction agent retained is about 14% or less, all based on the weight of cellulose present. These amounts are based primarily on acceptable contamination levels in future steps of the process.

The limiting factor on residual softener is the acceptable tolerance of contamination in the coating bath since full extraction of any residual softeners will occur during the extraction of the polymer coating. This is discussed above. The water moisture specification is also on the same basis. The amount of water that is known to be acceptable in a typical coating bath typically is about 0.5%. Under this restriction, the maximum amount of extractable water in the chips entering polymer recovery would be 1.8%. Since polymer extraction removes water down to 0.7% in the chips leaving the polymer extractor, the maximum water allowable in the chips entering the polymer extractor, would be 2.5% on a cellulose basis.

Any softener extraction agent left in the chips leaving the dryer can be completely removed during normal polymer extraction conditions and hence end up in the coating bath. The maximum equilibrium concentration of softener extraction agent in the coating bath is typically about 2% on a polymer solvent basis as discussed above. Softener extraction agent will enter the coating system through two sources, with the polymer extraction agent containing recovered polymer and with the "fresh" polymer extraction agent, i.e., a polymer solvent, from solvent recovery. The amount of softener extraction agent coming in with the fresh polymer solvent is usually neglible (<0.1%) and the residual softener extraction agent specification is based solely on the recovered polymer stream. The residual softener extraction agent in the chips would, then, not exceed 14% on a cellulose basis, at 15% recovered cellulose recycle.

The softener extraction agent in the recovered polymer stream which is used in bath make-up will be evaporated in the coating tower dryers and end up in the solvent recovery process. A minor amount of softener extraction agent will exit the process as residual in the coated film. The softener extraction agent must be stripped from the solvent recovery process both to maintain satisfactory operation and quality in the over-all plant process and to prevent water pollution since at equilibrium it can sewer with the water solumn bottoms using the usual industry recovery systems common for tetrahydrofuran.

The drying of softener extraction agent and water from swollen softener-free coated chips with through-circulation drying is a function of: (1) cake thickness, (2) gas flow in terms of superficial velocity and the gas stream composition and temperature, (3) percent $H_2O$ in the softener extraction agent, and (4) the time of contact, and (5) chip particle size.

The dried, comminuted solids now comprising regenerated cellulose coated with polymer are then passed to a polymer extraction unit where a solvent for the coating material is used as the extraction medium. This is represented by Block I. The features of the extraction equipment employed for the polymer extraction are similar to those of the equipment employed for the softener extraction. In both cases, the equipment is of vapor-tight construction and is equipped to maintain a gas atmosphere within the extraction units which is safely outside of the explosive limit range. Other types of extraction units can be used.

The dried chips which feed the polymer extractor must not be allowed to come in premature contact with vapors of the polymer extraction agent because it can condense on them prior to their entering the extractor. A small amount of polymer extraction agent on the "dry" chips can be sufficient to soften the coating and cause adjacent chips to stick together. If this occurs, the particles that are glued together may not be polymer extracted and severe cellulose quality degradation can thus ensue.

The dried, comminuted, softener-free solids are fed into the polymer-extraction unit represented by Block I and progressed from section to section of the extraction unit by impellers in a direction of flow that is countercurrent to the flow of the extraction solvent. When Saran is the coating, which generally is the case, the preferred extraction solvents tetrahydrofuran (THF) because it is very effective, efficient, and is usually the solvent for the coating that is used during the coating operation permitting it to be recycled back to the coating bath. The coating solvent is admitted to the extraction unit at the opposite end from the point of entry of the coated cellulose solids. As descriptively stated in regard to the features of of the softener extraction unit, the design of a preferred polymer extraction unit would be such as to permit alternate wetting and draining of the coated, comminuted solids without compressing the solids but insuring an intimate and thorough contact between the solids and the tetrahydrofuran.

The extracted coating material in solution is passed from the polymer extraction unit, filtered as represented by Block I–1 and transferred to the coating operation of the regenerated cellulose manufacturing process represented by Block I–2. This solution generally is used directly in the coating solution make-up system represented by Block I–3.

The product stream from the polymer coating extractor will include softener extraction agent, polymer extraction agent, water, polymer, softener, and "minor bath ingredients."

The minor bath ingredients consist of, e.g., the "waxes" and slip agents which impart surface properties to the film. Since these ingredients differ between bath types and the recovered polymer solution may be used as a component in all bath types, the bath ingredients can most advantageously be filered from the stream. The slip agent particles are relatively large, but the waxes are often considerably smaller and may readily blind normal filter media so a precoat or equivalent system is then indicated. In addition, some fatty acid types of "waxes" are soluble in the solid polymer extraction agent and will not be removed from the recovered polymer solution. Because of this latter situation, some programming may be required for optimum reuse of recovered coating solution in new coating solutions. As for the amount of softener, etc., permitted in recovered coating solution, exact procedures will depend on specific processes and needs.

The minimum concentration of recovered polymer in the extractor product stream is fixed by the amount of cellulose being processed and the amount of polymer solvent used in bath make-up. Typical bath make-up procedures are to slurry fresh polymer in a toluene polymer solvent mixture and, once the polymer is wetted and dispersed, fresh polymer solvent is added to dissolve the polymer. The solvents are added from a weigh tank and the recovered polymer solution will be added through the same tank as a substitute for a portion of the fresh polymer solvent.

The recovered polymer storage tank can be analyzed and the amount of both bath ingredients adjusted if necessary.

The polymer extractor considerations are similar to those for softener extraction. An important feature required is adquate draining of the chip mass discharging from the extractor. Solvent that discharges with the chips will generally be sent to solvent recoverey from the polymer solvent dryer in the form of a liquid stream containing 7–10% water and should, therefore, be kept to a minimum.

Polymer extraction, unlike the diffusion limited softener extraction, is a process of dissolving the polymer coating from the chip surface. The degree to which polymer extraction must proceed is strictly a function of the cellulose reuse quality requirements. For alkaline media cellulose reuse system where the product color is critical, the extraction efficiency must be extremely high as the reaction of alkaline materials with any residual poymer will cause severe browning. In addition, the presence of the polymer can detract from product quality where the reclaimed cellulose is used by either interfering with the reaction or by its presence in the final product.

After the extraction of the polymer takes place, the extraction agent retained in the cellulose chips is removed by selective drying. This is represented by Block J. This selective drying step will be discussed in relation to the preferred polymer extraction agent, i.e., THF.

Due to the high cost and undesirability of the presence in regenerated cellulose of THF for some end uses, it is preferably removed from the chips to levels below 1% on a cellulose basis.

This specific problem, that of high levels of residual solvents in dried swollen cellulose, has been reported throughout the literature for many years. With the exception of the specific method disclosed here in the present invention, no method has been reported that permits removal of the solvents to the low levels desired for this process without involving either gel structure collapse, excessive temperatures, high levels of water addition, or high residual moisture content in the regenerated cellulose—all considered as major negatives in this process scheme.

The THF drying process, termed "slurry drying," takes advantage of the large differences in vapor pressures between THF and water and the affinity of cellulose for water to displace the THF from the inner chip structure with $H_2O$. The process consists of slurrying the polymer extracted chips containing dry THF in a THF/water solution at 9/1 liquid-to-cellulose ratio and 7–10% $H_2O$, and drying the slurry as a cake via through-circulation of, e.g., $N_2$, at 75° F. using ½ to ¾ inch cake thickness. The initial rapid evaporation causes the cake to rapidly cool, e.g., to 20° F., where a rate of evaporation of the water is negligible. The cellulose affinity for $H_2O$ increases with decreasing temperature and the water is taken up in the internal structure replacing the THF. The cake then rapidly warms to the ambient gas temperature and at that point the THF has been removed (using, e.g., gas velocities 100 ft./min.). As drying is continued, the water composition will eventually fall to the equilibrium condition with the drying stream. FIG. 2 shows a typical graph of the temperature of the caked cellulose chips with increasing time. The presence of 5% THF in the gas stream does not affect final THF levels in the chips. At the stated conditions, the time to remove the THF to <1% is typically less than three minutes and water content of the dried regenerated cellulose is ≤10%.

The key elements are control of the gas stream water content such that the chips can dry to a water moisture content no greater than about 10%. Each point in the cake must pass through the temperature depression cycle and large variations in drying from point to point in the cake cannot be permitted if all the chips are to be dried to <1% THF.

The water content of the slurry must be controlled. Below 7% $H_2O$, the THF will generally not be completely displaced to less than 1% and above 10% $H_2O$, the residual $H_2O$ level in the chips will tend to be excessive.

The chips discharging from the dryer are stored in a bin, represented by Block K. These chips can be handled under normal conditions without excessive danger from the residual THF. Under normal operation of the dryer, the residual THF in the chips will be less than 1.0% THF and equilibrium of the dried chips with air in a vessel filled with chips is less than 2.5% of the LEL. Even at THF concentration of 5.3% in the chips, the amount of THF in their air space surrounding the chips is less than 10% of the LEL.

The THF removed from the chips during drying is recovered as represented by Block J–1 and sent to the solvent storage tanks represented by Block J–2.

In an alternate embodiment, where it is desirable to use a prior art process for recovering the softener, part of the process of the present invention can be used as follows:

In a process for recovering cellulose from softened and coated comminuted regenerated cellulose wherein the softener is first removed leaving coated comminuted cellulose wherein the internal pores of the cellulose are open, the improvement of removing the coating by the process consisting essentially of:

(a) removing the coating from the comminuted cellulose by flushing the comminuted cellulose with a coating solvent;

(b) adding water and coating solvent to the comminuted cellulose already laden with coating solevnt to form a slurry;

(c) drying the slurry of water, coating solvent and comminuted cellulose with a stream of gas selectively removing the coating solvent and the water leaving dried comminuted cellulose.

The particulars related to each step are discussed above in the specification.

The present invention is described in relation to the recovery of a Saran polymer-type coating. However, it is to be understood that it also applies to the recovery of cellulose coated with other coating materials, such as nitrocellulose, in which case, e.g., the softener recovery part of the process can be modified to permit removal of the nitrocellulose from the recovered softener according to methods known in the art. Since two different coating materials such as Saran and nitrocellulose are contaminants to each other, it is suggested that reclamation according to the present invention be accomplished on chips coated with only one type of coating material.

The present invention has the advantage of providing a process for reclaiming all the ingredients from softened and coated regenerated cellulose. The ingredients recovered are in a pure state and can be recycled back through the process thereby significantly minimizing the waste by-products resulting from the process of preparing regenerated cellulose. In addition, the cellulose chip recovered in very pure allowing it to be reused in many different applications.

One of the primary uses of the recovered cellulose chips is for recycle in the regenerated cellulose manufacturing process from which they were derived. The dried cellulose particles can be employed in the regenerated cellulose manufacturing process by adding the chips, after being precooled to, e.g. 0 to −8° C. temperature, to a mixture of sodium hydroxide and water maintained at a −7° C. temperature, mixing the constituents for ten minutes to form alkali cellulose, adding carbon disulfide at a −5° C. temperature, mixing for ten minutes to distribute the $CS_2$, warming the mix to a xanthation temperatures of, e.g., 28–32° C., and mixing with aqueous caustic soda for an additional 40 minutes to form viscose, filtering and evacuating viscose and finally blending this viscose with freshly made viscose so that the blended viscose contains from 0–20% recovered viscose. This viscose is then cast through a set of die lips to form a web in the regenerating bath. The subsequent processing is identical to that of the conventional regenerated cellulose manufacturing process. Film so produced has elongation and tear strength physical properties which are at least equal to the comparable physical properties of film produced from freshly prepared viscose.

We claim:

1. A process for recovering regenerated cellulose from softened and coated regenerated cellulose which comprises:
   (a) comminuting the regenerated cellulose;
   (b) humidifying the comminuted cellulose by adding water to the comminuted cellulose wherein the water swells the comminuted cellulose;
   (c) extracting the water and softener from the humidified, comminuted cellulose by flushing with a softener extraction agent;
   (d) drying the coated comminuted cellulose to remove the softener extraction agent;
   (e) removing the coating from the comminuted cellulose by flushing the comminuted cellulose with a coating solvent;
   (f) adding water and coating solvent to the comminuted celulose already laden with coating solvent to form a slurry; and
   (g) drying the slurry of water, coating solvent and comminuted cellulose with a stream of gas to selectively remove the coating solvent and leaving dried comminuted cellulose.

2. The process of claim 1 wherein the cellulose is comminuted to a size wherein all of the comminuted cellulose will pass through a sieve of U.S. sieve size No. 16 (0.0469 inch) and at least 60% pass through a sieve of U.S. sieve size No. 40 (0.0165 inch).

3. The process of claim 1 wherein the comminuted cellulose of 1(a) is swollen with water wherein the amount of water is at least about 70 weight percent of the mixture based on the dry weight of commonuted cellulose.

4. The process of claim 1 wherein extracting the solution of water and softener from the mixture is accomplished by countercurrent extraction.

5. The process of claim 1 wherein extraction of softener proceeds until there is about 0.2 weight percent softener present in the comminuted cellulose based on the weight of the cellulose present.

6. The process of claim 1 wherein the softener extracting agent is ethanol.

7. The process of claim 1 wherein the extract from step 1(c) of extracting water and softener from the comminuted cellulose is further processed by the steps comprising
   (a) rectifying the extract by fractionally distilling off the extraction agent;
   (b) recycling the recovered extraction agent to again extract softener and water from comminuted cellulose; and
   (c) recycling the undistilled softener and water to a softening bath used to soften cellulose film.

8. The process of claim 1 wherein drying in step 1(d) is carried out by passing a stream of gas through the comminuted celluose with the temperature of the gas no greater than about 30° C., drying the comminuted cellulose until the water moisture content of the comminuted cellulose is no greater than 2.5 weight percent based on the weight of the cellulose present.

9. The process of claim 1 wherein the coating extraction agent is added in step 1(e) in an amount sufficient to form a 9:1 ratio of coating extraction agent to cellulose on a weight basis.

10. The process of claim 1 in which the coating extraction agent is tetrahydrofuran.

11. The process of claim 10 in which the tetrahydrofuran is selectively dried from the comminuted cellulose to a level of 1 weight percent or less based on the weight of cellulose present.

12. The process of claim 1 wherein the extract from step 1(e) of flushing the comminuted cellulose with coating solvent is further processed by the steps comprising:
    (a) filtering the extract and
    (b) recycling the extract to the coating solution make-up and storage bath for coating a cellulose film.

13. The process of claim 1 wherein coating extraction agent obtained from selectively drying the comminuted cellulose of step 1(g) is recycled to a coating station and used to make up a coating solution.

14. In a process for recovering cellulose from softened and coated comminuted cellulose wherein the softener is first removed leaving a coated comminuted cellulose wherein the internal pores of the cellulose are open the improvement for removing the coating consisting essentially of:
    (a) removing the coating from the comminuted cellulose by flushing the comminuted cellulose with a coating solvent;
    (b) adding water and coating solvent to the comminuted cellulose already laden with coating solvent to form a slurry; and
    (c) drying the slurry of water, coating solvent and comminuted cellulose with a stream of gas to selectively remove the coating solvent and the water leaving dried communited cellulose.

References Cited
UNITED STATES PATENTS

| | | | |
|---|---|---|---|
| 2,026,865 | 1/1936 | Campbell et al. | 8—101 |
| 2,150,205 | 3 1939 | Cochran et al. | 8—101 |
| 2,337,928 | 12/1943 | Reichel | 264—37 |

DONALD E. CZAJA, Primary Examiner

D. W. GRIFFIN, Assistant Examiner

U.S. Cl. X.R.

264—37

PO-1050
(5/69)

UNITED STATES PATENT OFFICE
CERTIFICATE OF CORRECTION

Patent No. 3,758,457        Dated September 11, 1973

Inventor(s) James TenBroeck, Jr., Robert Bruce Perry, Dale Roderic Laurance, and John Richard Fisher It is certified that error appears in the above-identified patent and that said Letters Patent are hereby corrected as shown below:

On sheets 1 and 2 of the drawings and in column 1, line 4, coinventor "James Samuel Ten Broeck, Jr." should be identified as -- James Samuel TenBroeck, Jr. --.

Column 6, line 37, "DMP" should read -- DMF --.

Signed and sealed this 19th day of February 1974.

(SEAL)
Attest:

EDWARD M. FLETCHER, JR.
Attesting Officer

C. MARSHALL DANN
Commissioner of Patents